United States Patent
Al-Rasheed et al.

(10) Patent No.: US 11,247,080 B2
(45) Date of Patent: Feb. 15, 2022

(54) SYSTEMS, METHODS, AND APPARATUSES FOR ENSURING WORKER SAFETY

(71) Applicant: Saudi Arabian Oil Company, Dhahran (SA)

(72) Inventors: Hussain Al-Rasheed, Dhahran (SA); Abdullah Al Zahrani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/024,294

(22) Filed: Sep. 17, 2020

(65) Prior Publication Data
US 2021/0106855 A1    Apr. 15, 2021

Related U.S. Application Data
(60) Provisional application No. 62/913,269, filed on Oct. 10, 2019.

(51) Int. Cl.
*A62B 35/00*       (2006.01)
*H04W 4/80*       (2018.01)
(Continued)

(52) U.S. Cl.
CPC ...... *A62B 35/0025* (2013.01); *A44B 11/2569* (2013.01); *A62B 35/0043* (2013.01);
(Continued)

(58) Field of Classification Search
CPC ............................ A62B 35/0025; H04W 4/80
See application file for complete search history.

(56) References Cited

U.S. PATENT DOCUMENTS
6,265,983 B1 * 7/2001 Baillargeon ....... A62B 35/0037
                                                                340/673
6,868,941 B1 * 3/2005 Hermann ........... A62B 35/0037
                                                                182/18
(Continued)

FOREIGN PATENT DOCUMENTS
EP    2314354 A2    4/2011
JP    5147636 B2    2/2013
(Continued)

OTHER PUBLICATIONS
Palazon, Jose Antonio et al.; "Wireless Solutions for Improving Health and Safety Working Conditions in Industrial Environments" 2013 IEEE 15th International Conference on e-Health Networking, Applications and Services (Healthcom 2013); pp. 544-548.
(Continued)

*Primary Examiner* — Brian E Miller
(74) *Attorney, Agent, or Firm* — Bracewell LLP; Constance G. Rhebergen; Vivek P. Shankam

(57) ABSTRACT

Methods, systems, and apparatuses for ensuring safety of a worker are disclosed. The system includes a first fastener configured to secure two or more ends of a harness around the user, a first sensor unit attached to the first fastener, the first sensor unit configured to generate a first signal when the first fastener is in a locked position, a tether attached to a portion of the harness, the tether configured to tether the user to a stationary or movable object, and a second fastener attached to one end of the tether, the second fastener configured to secure the one end of the tether to the stationary or movable object, a second sensor unit attached to the second fastener, the second sensor unit configured to generate a second signal when the second fastener is in a locked position, and a controller unit wirelessly connected to the first sensor unit and the second sensor unit, the controller unit configured to generate a third signal when the first or the
(Continued)

second signal is not received by the controller unit within a predetermined period of time.

28 Claims, 5 Drawing Sheets

(51) Int. Cl.
    *A44B 11/25*     (2006.01)
    *B60R 22/48*     (2006.01)
    *F16B 45/00*     (2006.01)

(52) U.S. Cl.
    CPC ....... *H04W 4/80* (2018.02); *B60R 2022/4816* (2013.01); *F16B 45/00* (2013.01)

(56) References Cited

U.S. PATENT DOCUMENTS

| | | | |
|---|---|---|---|
| 8,482,401 B2 | 7/2013 | Morino et al. | |
| 9,392,826 B2* | 7/2016 | Beckett | A41D 13/0506 |
| 9,421,402 B2* | 8/2016 | Blaise | A62B 35/0043 |
| 9,480,866 B2 | 11/2016 | Pollard | |
| 9,498,659 B2* | 11/2016 | Schurian | A62B 35/04 |
| 10,265,196 B2* | 4/2019 | Ha | B25J 9/0006 |
| 10,586,444 B2* | 3/2020 | Leary | E05B 41/00 |
| 10,610,710 B2* | 4/2020 | Huseth | A62B 35/04 |
| 10,729,922 B2* | 8/2020 | Huseth | A62B 35/0025 |
| 2010/0231402 A1* | 9/2010 | Flynt | G08B 19/00 340/679 |
| 2011/0090079 A1* | 4/2011 | Morino | A62B 35/0075 340/532 |
| 2011/0103558 A1* | 5/2011 | Hooten | A62B 35/04 379/37 |
| 2012/0217091 A1* | 8/2012 | Baillargeon | G08B 21/182 182/18 |
| 2012/0302406 A1* | 11/2012 | Hinds | A63B 21/4021 482/8 |
| 2015/0265860 A1* | 9/2015 | Kennedy | F16B 45/02 182/3 |
| 2015/0276521 A1* | 10/2015 | Moore, Jr | A62B 35/0025 702/41 |
| 2016/0006870 A1* | 1/2016 | Merjanian | H04W 4/02 379/45 |
| 2016/0066124 A1* | 3/2016 | Chang | H04B 1/385 455/41.2 |
| 2016/0140828 A1* | 5/2016 | DeForest | G08B 21/0211 340/539.12 |
| 2016/0154952 A1* | 6/2016 | Venkatraman | G06Q 20/321 705/44 |
| 2016/0165387 A1* | 6/2016 | Nhu | H04L 67/10 455/41.1 |
| 2016/0335879 A1* | 11/2016 | Carr | G16H 40/67 |
| 2016/0366065 A1* | 12/2016 | Kazanchian | H04B 7/15 |
| 2017/0147765 A1* | 5/2017 | Mehta | A61B 5/681 |
| 2017/0162020 A1* | 6/2017 | Pham | A62B 35/0025 |
| 2017/0309152 A1 | 10/2017 | Dinkins | |
| 2018/0109930 A1* | 4/2018 | Kim | H04L 51/046 |
| 2018/0117373 A1* | 5/2018 | Cuny | G08B 21/0446 |
| 2018/0132735 A1* | 5/2018 | Weebadde | A61B 5/318 |
| 2018/0197633 A1* | 7/2018 | Mehta | G06Q 10/0633 |
| 2018/0322944 A1* | 11/2018 | Valdizan | G08B 21/18 |
| 2019/0012900 A1* | 1/2019 | Pham | A62B 35/04 |
| 2019/0070445 A1* | 3/2019 | Huseth | A62B 35/0025 |
| 2019/0160310 A1* | 5/2019 | Thompson | H04B 1/034 |
| 2019/0269949 A1* | 9/2019 | Kennedy | A62B 99/00 |
| 2020/0016439 A1 | 1/2020 | Perner et al. | |
| 2020/0368563 A1* | 11/2020 | Nowicki | G08B 21/02 |

FOREIGN PATENT DOCUMENTS

| | | |
|---|---|---|
| JP | 2019005425 A | 1/2019 |
| JP | 2019005547 A | 1/2019 |
| KR | 101219182 B1 | 1/2013 |
| KR | 101872314 B1 | 6/2018 |
| WO | 2014003410 A | 1/2014 |
| WO | 2019080089 A1 | 5/2019 |

OTHER PUBLICATIONS

International Search Report and Written Opinion for International Application No. PCT/US2020/055124, Report dated Mar. 3, 2021; pp. 1-16.

\* cited by examiner

SYSTEMS, METHODS, AND APPARATUSES FOR ENSURING WORKER SAFETY

BACKGROUND

1. Technical Field

Embodiments generally relate to systems and methods employed for ensuring worker safety. More specifically, embodiments relate to apparatuses that may be used in a work environment to ensure worker safety.

2. Description of the Related Art

The Occupational Safety and Health Administration (OSHA) enforces a long list of workplace standards. Each year OSHA produces a list of the ten standards that employers violated the most during the previous fiscal year. Almost every year fall protection generates the most violations.

Standard 1926.501 is designed to protect construction workers from fall-related accidents, a leading cause of work-related deaths and serious injuries. A construction site can have numerous fall hazards. Workers may tumble off high places like ladders, roofs, and steel beams. They can fall into or over equipment or machinery located at ground level. Workers can also fall into underground holes or trenches. Standard 1926.501 is intended to prevent falls at all levels.

The fall protection standard requires employers to provide fall protection systems when employees are working at elevations of six feet or more. Examples are guard rails, safety harnesses, safety nets, toe-boards, and hole covers.

SUMMARY

Reduced costs and improved worker productivity are driving the development of smart wearables and sensors in industrial environments. The Internet of Things, or IoT, is answering that expectation by turning everyday products into the equivalent of a smartphone: tools with advanced features that enhance usability or increase efficiency.

More companies each year adopt sensors and connectivity to yield greater value, not only through the promise of data, but also by providing better safety and long-term cost savings through active prevention of accidents. These products measure and react, but ultimately, they protect the individual and prevent health issues and tragic situations.

This disruptive force slowly is entering personal protective equipment (PPE). Workers rely on PPE to ensure their safety. End users, employers, and purchasers share a strong common interest: To provide the PPE and other safety equipment that not only complies with regulations, but also genuinely increases protection by lowering the risk of (and even prevents) workplace injuries and the ensuing costs. It is up to employers to request "smart" safety equipment and the manufacturers from which they purchase to make this happen.

Strict regulations, the need to differentiate offerings and the search for better safety solutions are driving market expansion. As with other industries, wearables and smart sensors that improve safety increasingly will be adopted by factories and manufacturers and lead to regulatory changes that promise an even greater edge to the companies who are first adopters.

One of the greatest challenges faced by safety professionals is increasing user safety and decreasing injury-related costs within existing regulations. From factories to construction sites, work environments are full of health hazards and dangers. In 2015, there were approximately 2.9 million non-fatal injuries and illnesses reported by private industry employers, per the U.S. Bureau of Labor Statistics. The causes of these injuries range from the actual equipment to environmental hazards.

PPE manufacturers are looking for ways to improve worker health and safety without significantly increasing production costs. For these companies and others, IoT is triggering innovation. In the realm of PPE, companies are beginning to produce wearable technologies that improve performance and reduce error, along with products that send information from tools and equipment to systems that monitor the environment and improve equipment maintenance.

Accordingly, one example embodiment is a system for ensuring safety of a user. The system includes a first fastener configured to secure two or more ends of a harness around the user, and a first sensor unit attached to the first fastener, the first sensor unit configured to generate a first signal when the first fastener is in a locked position. The system further includes a tether attached to a portion of the harness, the tether configured to tether the user to a stationary or movable object, a second fastener attached to one end of the tether, the second fastener configured to secure the one end of the tether to the stationary or movable object, and a second sensor unit attached to the second fastener, the second sensor unit configured to generate a second signal when the second fastener is in a locked position. The system also includes a controller unit wirelessly connected to the first sensor unit and the second sensor unit, the controller unit configured to generate a third signal when the first or the second signal is not received by the controller unit within a predetermined period of time. The controller unit may be further configured to identify the first fastener and the second fastener using a unique identifier associated with the first fastener and the second fastener. The first sensor unit and the second sensor unit each include a contact sensor configured to generate a signal when the corresponding fastener is in a locked position.

Another example embodiment is a method for ensuring safety of a user. The method includes providing a first fastener configured to secure two or more ends of a harness around the user, and providing a first sensor unit in conjunction with the first fastener, the first sensor unit configured to generate a first signal when the first fastener is in a locked position. The method may also include attaching a tether to a portion of the harness, the tether configured to tether the user to a stationary or movable object, attaching a second fastener to one end of the tether, the second fastener configured to secure the one end of the tether to the stationary or movable object, and providing a second sensor unit in conjunction with the second fastener, the second sensor unit configured to generate a second signal when the second fastener is in a locked position. The method may further include wirelessly connecting a controller unit to the first sensor unit and the second sensor unit, wherein the controller unit is configured to generate a third signal when the first or the second signal is not received by the controller unit within a predetermined period of time.

Another embodiment is an apparatus for ensuring safety of a user. The apparatus includes a fastener configured to secure two or more ends of a harness around the user, and a sensor unit attached to the fastener, the sensor unit configured to generate a signal when the fastener is in a locked position.

Another example embodiment is an apparatus for ensuring safety of a user. The apparatus includes a fastener configured to secure one end of a tether to a stationary or movable object, and a sensor unit attached to the fastener, the sensor unit configured to generate a signal when the fastener is in a locked position.

BRIEF DESCRIPTION OF THE DRAWINGS

All aspects and features of certain example embodiments of the present disclosure will be more apparent from the following description taken in conjunction with the accompanying drawings, in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

Figure 1:
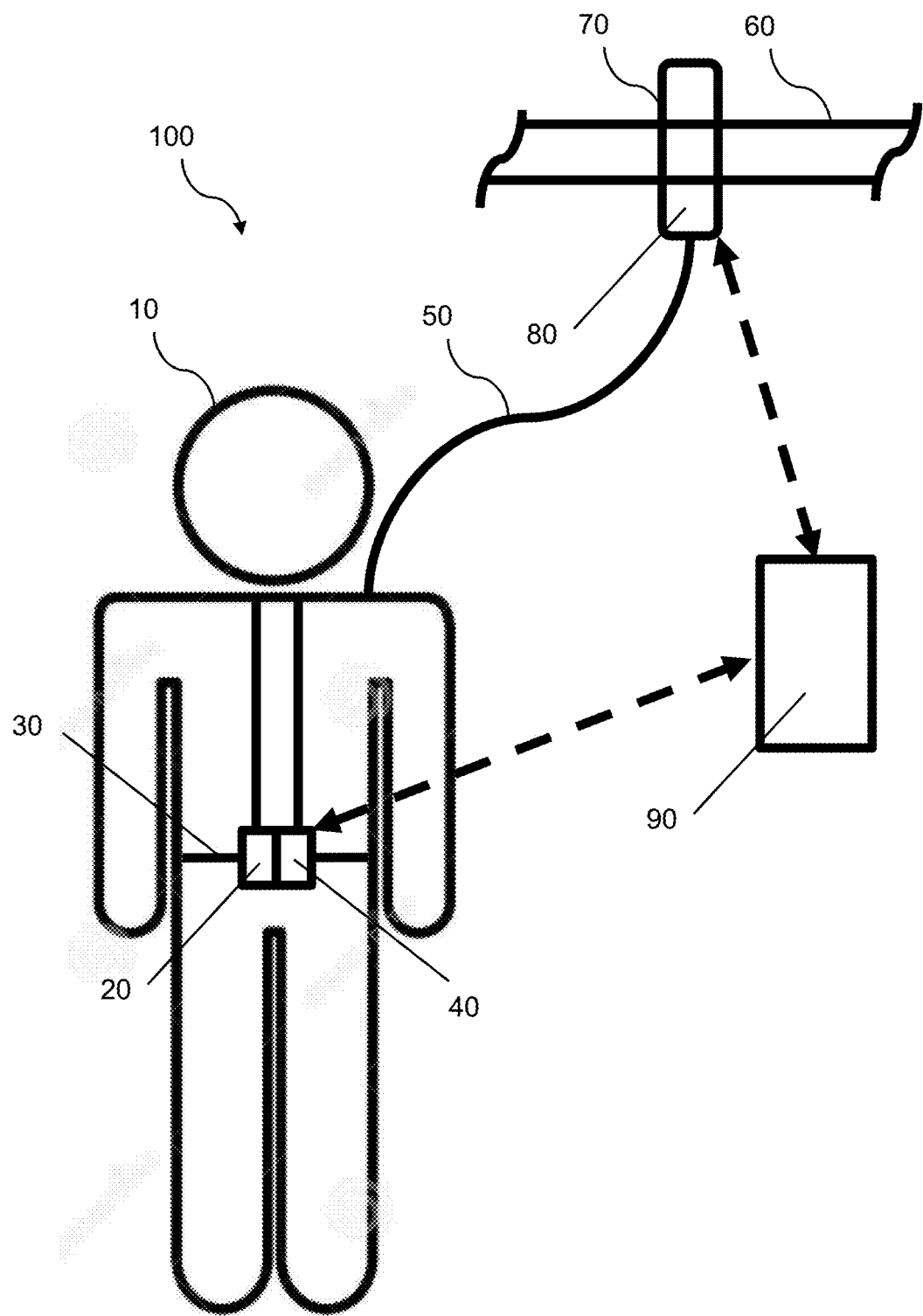
FIG. 1 illustrates a system for ensuring safety of a user, according to one or more example embodiments.

FIG. 1 illustrates a system 100 for ensuring safety of a user 10, according to one or more example embodiments. The system 100 includes a first fastener 20, such as a buckle, configured to secure two or more ends of a harness 30 around the user 10. A first sensor unit 40 is attached to the first fastener 20 where the first sensor unit 40 is configured to generate a first signal when the first fastener 20 is in a locked position. The first sensor unit 40 may be configured to generate a different signal when the first fastener 20 is in an unlocked position. The system 100 further includes a tether 50 attached to a portion of the harness 30. The tether 50 is configured to tether the user 10 to a stationary or movable object 60. The tether may include a belt, a rope, a chain, or a combination thereof. A second fastener 70, such as a D-ring or hook, is attached to one end of the tether 50. The second fastener 70 is configured to secure the one end of the tether 50 to the stationary or movable object 60. A second sensor unit 80 is attached to the second fastener 70 where the second sensor unit 80 is configured to generate a second signal when the second fastener 70 is in a locked position. The second sensor unit 80 may be configured to generate a different signal when the second fastener 70 is in an unlocked position. The system 100 also includes a controller unit 90, such as a smartphone, that may be wirelessly connected to the first sensor unit 40 and the second sensor unit 80. The controller unit 90 is configured to generate a third signal when the first or the second signal is not received by the controller unit 90 within a predetermined period of time. The predetermined period of time can be a set time after the earlier of the first and second signal is generated. For example, if the user 10 buckles up his harness and within five minutes thereof, the D-ring is not locked, then a signal may be generated on the controller to alert the user and/or the supervisor in the control room. Similarly, if the user 10 locks his D-ring and within five minutes thereof, the user does not buckle up his harness, then a signal may be generated on the controller to alert the user and/or the supervisor in the control room. Similarly, alert signals may be generated by the controller 90 when the relative acceleration and/or altitude between the first fastener 40 and the second fastener 80 is above or below a predetermined threshold range.

In one embodiment, if the worker 10 is elevated above a predetermined height, the system 100 detects if the worker is wearing the harness by checking if buckle 20 is securely latched onto his controller 90 or is within a certain range from the controller 90 if the controller is a smart phone (using Bluetooth, for example). The buckle 20 provides an ID to correlate the harness 30 with the user. In another embodiment, the system 100 detects if the worker 10 is using the harness 30 by ensuring the hook sensor acceleration is not the same speed as the main controller 90 that is attached to the worker's body. This ensures that the worker is not hooking the sensor on his body while elevating or when elevated. The system 100 also checks the movement of the hook sensor after elevating. If the sensor records significant movement, then it indicates that it is not hooked. The system 100 also enables tracking clipping on and off (securing and un-securing the hook) to detect the hook behavior and predict if it is being hooked and moving (attached on body or moving object) or unhooked and thrown on the floor while the worker is working in one site. The system 100 also tracks the direction of movement of the hook 70 to determine that it is hooked to a horizontal or vertical platform and is not laying on the floor.

The controller unit 90 may be further configured to identify the first fastener 20 and the second fastener 70 using a unique identifier, such as a radio frequency identification (RFID) tag, associated with the first fastener 20 and the second fastener 70. In one embodiment, the first sensor unit 40 and the second sensor unit 80 may each include a contact sensor configured to generate a signal when the corresponding fastener is in a locked position. The contact sensor may include at least one of a piezoelectric sensor, capacitive sensor, resistive sensor, magnetostrictive sensor, and an optical sensor. In one embodiment, the first sensor unit 40 and the second sensor unit 80 may each include a wireless transmitter configured to transmit the first signal or the second signal to the controller unit 90. In one embodiment, the first sensor unit 40 and the second sensor unit 80 may each include a battery unit configured to provide power to the transmitter and the contact sensor. The controller unit 90 may include a programmable logic controller (PLC), a general purpose controller, a processor, a smart phone, a smart watch, a smart ring, a smart band, or any wireless device.

In one embodiment, the first sensor unit 40 and the second sensor unit 80 are wirelessly connected to the controller unit 90 via radio frequency, Bluetooth, Bluetooth low energy, ZigBee, Wi-Fi, 2G, 3G, 4G LTE, 5G, or other wireless communication techniques. In one embodiment, the first sensor unit 40 and the second sensor unit 80 may each include an altimeter configured to generate a signal when the corresponding fastener reaches a predetermined altitude. An altimeter or an altitude meter is an instrument used to measure the altitude of an object above a fixed level. The measurement of altitude is called altimetry, which is related to the term bathymetry, the measurement of depth under water.

In one embodiment, the first sensor unit 40 and the second sensor unit 80 may each include an accelerometer configured to generate a signal when the corresponding fastener reaches a predetermined acceleration. An accelerometer is a device that measures proper acceleration. Proper acceleration, being the acceleration (or rate of change of velocity) of a body in its own instantaneous rest frame, is not the same as coordinate acceleration, being the acceleration in a fixed coordinate system. For example, an accelerometer at rest on the surface of the Earth will measure an acceleration due to Earth's gravity, straight upwards of g 9.81 m/s$^2$. By contrast, accelerometers in free fall (falling toward the center of the Earth at a rate of about 9.81 m/s$^2$) will measure zero.

In one embodiment, the first sensor unit 40 and the second sensor unit 80 may each include single or multi-axis models of accelerometers to detect magnitude and direction of the proper acceleration, as a vector quantity, and can be used to sense orientation (because direction of weight changes), coordinate acceleration, vibration, shock, and falling in a resistive medium (a case where the proper acceleration changes, since it starts at zero, then increases). Micromachined microelectromechanical systems (MEMS) accelerometers can also be used to detect the position of the device 40, 80.

Figure 2:
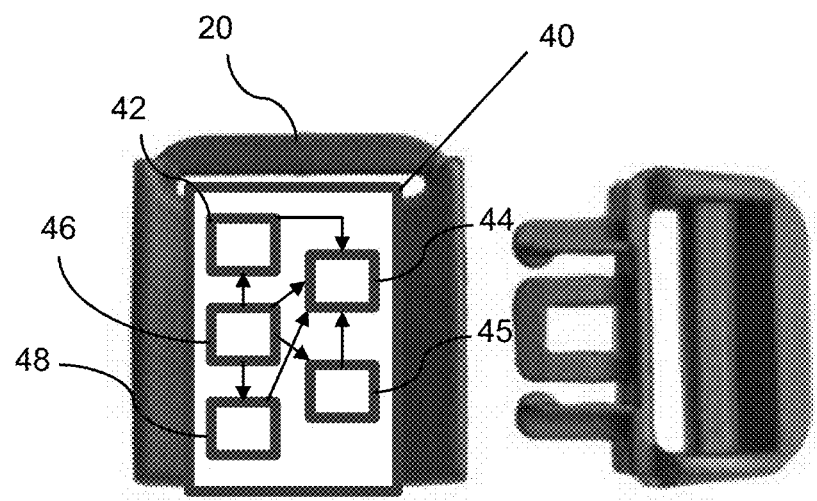
FIG. 2 illustrates an apparatus for ensuring safety of a user, according to one or more example embodiments.

FIG. 2 illustrates an apparatus, such as a fastener 20 or smart buckle, for ensuring safety of a user, according to one or more example embodiments. The apparatus includes a fastener 20 configured to secure two or more ends of a harness around the user. The apparatus also includes a sensor unit 40, which may be attached to the fastener 20 or embedded within the body of the fastener 20. The sensor unit 40 may be configured to generate a signal when the fastener 20 is in a locked position.

In one embodiment, the sensor unit 40 may include a contact sensor 42 configured to generate a signal when the fastener 40 is in a locked position. The contact sensor 42 may include at least one of a piezoelectric sensor, capacitive sensor, resistive sensor, magnetostrictive sensor, and an optical sensor. In one embodiment, the sensor unit 40 may include a wireless transmitter 44 configured to transmit a signal to the controller unit 90. In one embodiment, the sensor unit 40 may include a battery unit 46 configured to provide power to the transmitter 44 and the contact sensor 42.

In one embodiment, the sensor unit 40 may be wirelessly connected to the controller unit 90 via radio frequency, Bluetooth, Bluetooth low energy, ZigBee, Wi-Fi, 2G, 3G, 4G LTE, 5G, or other wireless communication techniques. In one embodiment, the sensor unit 40 may include an altimeter 45 configured to generate a signal when the fastener 20 reaches a predetermined altitude. An altimeter or an altitude meter is an instrument used to measure the altitude of an object above a fixed level. The measurement of altitude is called altimetry, which is related to the term bathymetry, the measurement of depth under water.

In one embodiment, the sensor unit 40 may include an accelerometer 48 configured to generate a signal when the fastener 20 reaches a predetermined acceleration. An accelerometer is a device that measures proper acceleration. Proper acceleration, being the acceleration (or rate of change of velocity) of a body in its own instantaneous rest frame, is not the same as coordinate acceleration, being the acceleration in a fixed coordinate system. For example, an accelerometer at rest on the surface of the Earth will measure an acceleration due to Earth's gravity, straight upwards of g≈9.81 m/s$^2$. By contrast, accelerometers in free fall (falling toward the center of the Earth at a rate of about 9.81 m/s$^2$) will measure zero.

In one embodiment, the sensor unit 40 may include single or multi-axis models of accelerometers to detect magnitude and direction of the proper acceleration, as a vector quantity, and can be used to sense orientation (because direction of weight changes), coordinate acceleration, vibration, shock, and falling in a resistive medium (a case where the proper acceleration changes, since it starts at zero, then increases). Micromachined microelectromechanical systems (MEMS) accelerometers can also be used to detect the position of the device 40.

Figure 3:
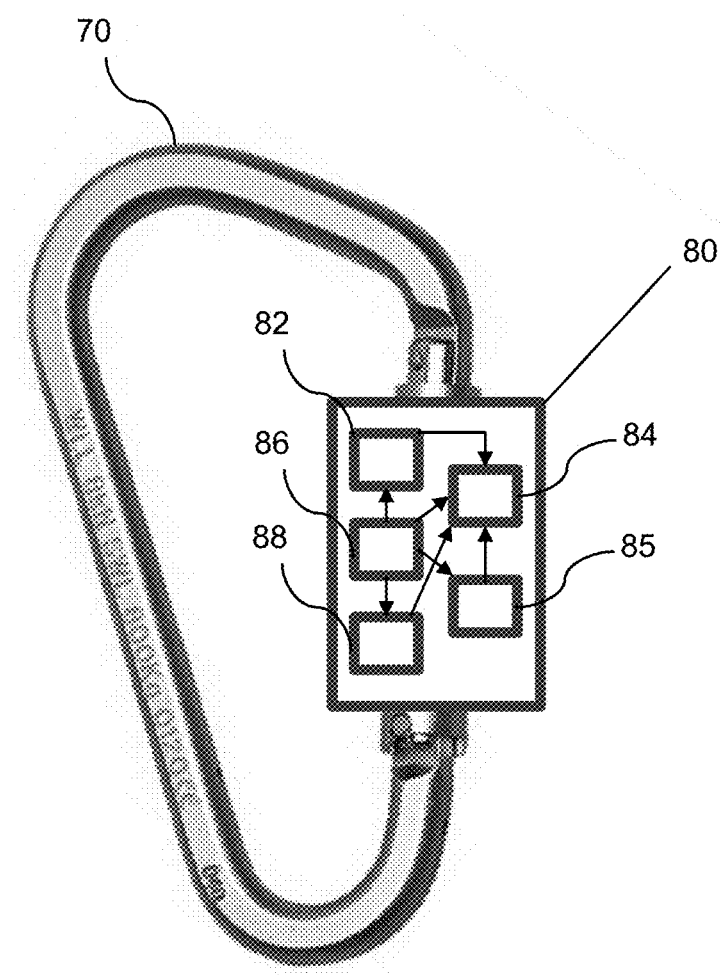
FIG. 3 illustrates an apparatus for ensuring safety of a user, according to one or more example embodiments.

FIG. 3 illustrates an apparatus for ensuring safety of a user, according to one or more example embodiments. The apparatus includes a fastener 70, such as a D-ring, configured to secure one end of a tether to a stationary or movable object. The apparatus also includes a sensor unit 80, which may be attached to the fastener 70 or embedded within the body thereof. The sensor unit 80 may be configured to generate a signal when the fastener 70 is in a locked position.

In one embodiment, the sensor unit 80 may include a contact sensor 82 configured to generate a signal when the fastener 80 is in a locked position. The contact sensor 82 may include at least one of a piezoelectric sensor, capacitive sensor, resistive sensor, magnetostrictive sensor, and an optical sensor. In one embodiment, the sensor unit 80 may include a wireless transmitter 88 configured to transmit a signal to the controller unit 90. In one embodiment, the sensor unit 80 may include a battery unit 86 configured to provide power to the transmitter 88 and the contact sensor 82.

In one embodiment, the sensor unit 80 may be wirelessly connected to the controller unit 90 via radio frequency, Bluetooth, Bluetooth low energy, ZigBee, Wi-Fi, 2G, 3G, 4G LTE, 5G, or other wireless communication techniques. In one embodiment, the sensor unit 80 may include an altimeter 85 configured to generate a signal when the fastener 70 reaches a predetermined altitude. An altimeter or an altitude meter is an instrument used to measure the altitude of an object above a fixed level. The measurement of altitude is called altimetry, which is related to the term bathymetry, the measurement of depth under water.

In one embodiment, the sensor unit 80 may include an accelerometer 88 configured to generate a signal when the fastener 70 reaches a predetermined acceleration. An accelerometer is a device that measures proper acceleration. Proper acceleration, being the acceleration (or rate of change of velocity) of a body in its own instantaneous rest frame, is not the same as coordinate acceleration, being the acceleration in a fixed coordinate system. For example, an accelerometer at rest on the surface of the Earth will measure an acceleration due to Earth's gravity, straight upwards of g 9.81 m/s$^2$. By contrast, accelerometers in free fall (falling toward the center of the Earth at a rate of about 9.81 m/s$^2$) will measure zero.

In one embodiment, the sensor unit 80 may include single or multi-axis models of accelerometers to detect magnitude and direction of the proper acceleration, as a vector quantity, and can be used to sense orientation (because direction of weight changes), coordinate acceleration, vibration, shock, and falling in a resistive medium (a case where the proper acceleration changes, since it starts at zero, then increases). Micromachined microelectromechanical systems (MEMS) accelerometers can also be used to detect the position of the device 80.

Figure 4:
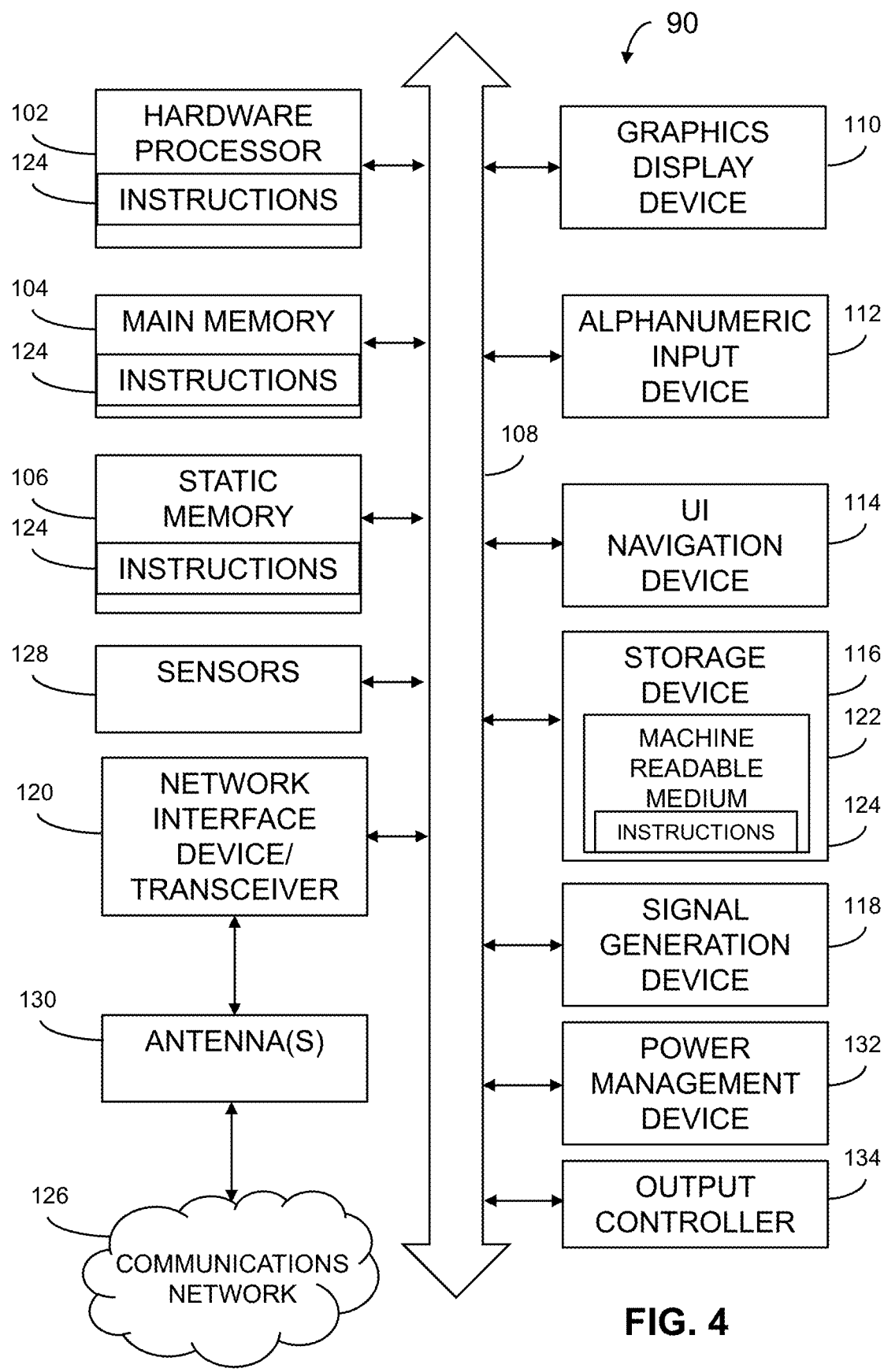
FIG. 4 illustrates an example apparatus, such as a controller, for ensuring safety of a user, according to one or more example embodiments of the present disclosure.

FIG. 4 illustrates an example apparatus, such as the controller 90, for ensuring safety of a user, according to one or more example embodiments of the present disclosure. In some embodiment, the controller unit 90 may include a programmable logic controller (PLC), a general purpose controller, a processor, a smart phone, a smart watch, a smart ring, a smart band, or any wireless device. The machine 90 may operate as a standalone device or may be connected (e.g., networked) to other machines. In a networked deployment, the machine 90 may operate in the capacity of a server machine, a client machine, or both in server-client network environments. In an example, the machine 90 may act as a peer machine in peer-to-peer (P2P) (or other distributed) network environment. The machine 90 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 90 may include a hardware processor 102 (e.g., a central processing unit (CPU), a graphics processing unit (GPU), a hardware processor core, or any combination thereof), a main memory 104 and a static memory 106, some or all of which may communicate with each other via an interlink (e.g., bus) 108. The machine 90 may further include a power management device 132, a graphics display device 110, an alphanumeric input device 112 (e.g., a keyboard), and a user interface (UI) navigation device 114 (e.g., a mouse). In an example, the graphics display device 110, alphanumeric input device 112 and UI navigation device 114 may be a touch screen display. The machine 90 may additionally include a storage device (i.e., drive unit) 116, a signal generation device 118 (e.g., a speaker), a network interface device/transceiver 120 coupled to antenna(s) 130, and one or more sensors 128, such as a global positioning system (GPS) sensor, compass, accelerometer, or other sensor. The machine 90 may include an output controller 134, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.).

The storage device 116 may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within the static memory 106, or within the hardware processor 102 during execution thereof by the machine 90. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the machine 90 and that cause the machine 90 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium includes a machine readable medium with a plurality of particles having resting mass. Specific examples of massed machine readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magnetooptical disks; and CD-ROM and DVD-ROM disks.

The instructions 124 may further be transmitted or received over a communications network 126 using a transmission medium via the network interface device/transceiver 120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15 family of standards, and peer-to-peer (P2P) networks, among others. In an example, the network interface device/transceiver 120 may include one or more physical jacks (e.g., Ethernet, coaxial, or phone jacks) or one or more antennas to connect to the communications network 126. In an example, the network interface device/transceiver 120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 90, and includes digital or analog communications signals or other intangible media to facilitate communication of such software.

In one embodiment, the controller unit 90 may include a temperature sensor configured to measure a body temperature of the user, and generate a signal when the body temperature is above a predetermined threshold. In another embodiment, the controller unit 90 may include a heart rate sensor configured to measure a heart rate of the user, and generate a signal when the heart rate is above or below a predetermined threshold. In another embodiment, the controller unit 90 may include a sensor for measuring blood pressure of the user, and generate a signal when the blood pressure is above or below a predetermined threshold. In one embodiment, the controller unit 90 may include a chemical sensor configured to generate a signal when the amount of a chemical sensed or detected is above a predetermined threshold.

Figure 5:
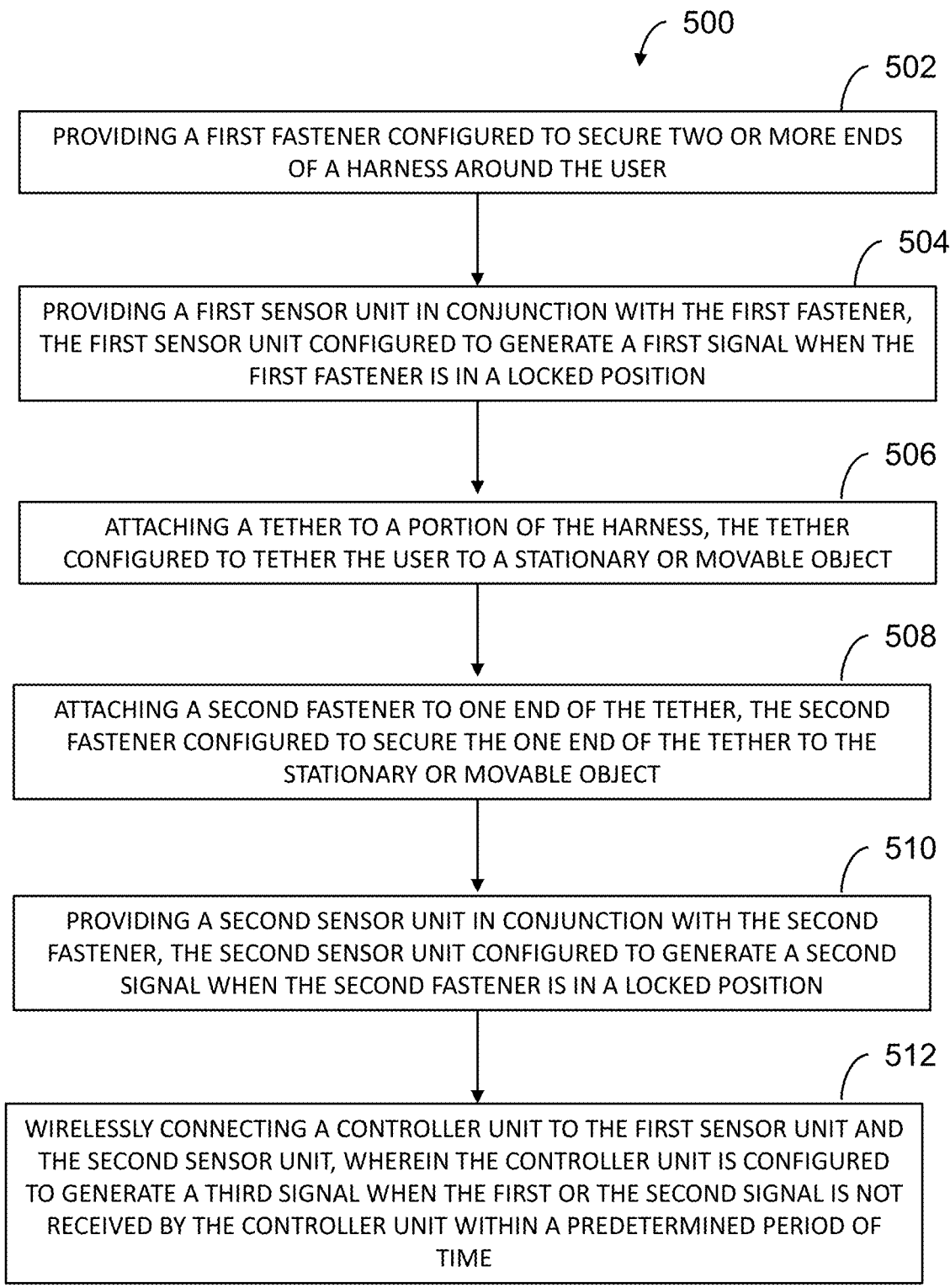
FIG. 5 illustrates example steps in a method for ensuring worker safety, according to one or more example embodiments of the present disclosure.

Another example embodiment is a method 500 for ensuring safety of a user, as illustrated in FIG. 5. The method 500 includes, at step 502, providing a first fastener configured to secure two or more ends of a harness around the user. At step 504, the method includes providing a first sensor unit in conjunction with the first fastener, the first sensor unit configured to generate a first signal when the first fastener is in a locked position. At step 506, the method may also include attaching a tether to a portion of the harness, the tether configured to tether the user to a stationary or movable object. At step 508, the method includes attaching a second fastener to one end of the tether, the second fastener configured to secure the one end of the tether to the stationary or movable object. At step 510, the method includes providing a second sensor unit in conjunction with the second fastener, the second sensor unit configured to generate a second signal when the second fastener is in a locked position. At step 512, the method may further include wirelessly connecting a controller unit to the first sensor unit and the second sensor unit, wherein the controller unit is configured to generate a third signal when the first or the second signal is not received by the controller unit within a predetermined period of time.

As illustrated in the above embodiments, smart PPEs save time and improve productivity through connectivity, live updates, and remote communication. Sensors automate processes that currently take place through manual labor. Daily inspection of workers can be replaced with a smart app and sensors that monitor for leakage or body temperature changes. When a leak is detected, the smart system sends an alert directly to the control room. The sensors, coupled with connectivity to mobile apps and data storage on the cloud, create a safer environment and save both end-users and their employers' valuable time and expense.

Saving lives and actively preventing injury cuts down on costs associated with workplace accidents. Smart sensors and components, in combination with connectivity and data storage, enable personal protective equipment to offer better health and safety protection. "Smart" health and safety equipment can identify patterns or danger points that can lead to injury or which increase risk. One example is a mine or oil rig with a network of connected sensors that prevent falls and fatal accidents.

In one embodiment, the system may include a central locating system which uses a network system to identify the location of each worker. In one embodiment, the system may provide environmental protection from invisible risks, such as a smart protective clothing with gas, chemical, heat, sound, UV, impact and pulse sensors monitor both the external environment and the user, alerting them to danger in time for preventative steps and alerting supervisors if workers are in trouble.

In one embodiment, the system may provide improved efficiency through remote management, such as a smart, connected safety containers monitor hazardous materials via chemical and liquid sensors, and send regular notifications or LED/sound alerts when things are fine, and if there is a leak, the smart container alerts the control room directly.

The system may also include phone-based app alerts, such as smart sensors and wearables connected to apps that can send crucial alerts, from notifying EMTs that their medicine is out of date, to alerting users when they misuse a tool, to warnings about weather and emergency situations at a facility.

In some embodiments, the system tracks the worker elevation, worker movement, and the hook/fastener movement to determine if the fastener is secured. In some embodiments, the apparatus can detect noise levels and filter out the noise from the signal. For example, if the sensors pick up a lot of noise, then a band-pass or low-pass or high-pass filter within the apparatus can reduce or eliminate the noise in the signals to accurately determine the (locked or unlocked) position of the fastener.

In some embodiments, the users may be provided with the devices once they arrive to the site and the devices are connected to their profile via their identification information and Face ID, for example. Face ID is an additional layer of security where the user is authenticated based on his/her appearance, and if the user is different from the user to which the device is assigned, then the device may not allow the user to be authenticated on this device. Every day the user arrive to work at the site, they will log in via Face ID and device ID to correlate the device to the owner of the system.

In some embodiments, the system can also detect collision danger from other moving equipment in the work environment. For example, the moving equipment can be equipped with another sensor that may communicate with the sensor in the fastener so that when the moving equipment is too close to the user or the moving equipment is fast approaching the user, then the user may be alerted using sound, vibration, and/or visual alert including, for example, light. The alerts can come from the controller or the vest, the helmet, or any other PPE, or a standalone device that may be distributed over the site.

In some embodiments, the controller uses any low power connectivity with the other devices or sensors or the server. Examples include but are not limited to Bluetooth Low Energy (BLE), ZigBee, Wi-Fi, 3G, 4G, or 5G technology.

In some embodiments, the system also sends the alert to a supervisor and/or manager on the site. The events may be also be recorded over a period of time and presented to the supervisor and/or manager in the form of an audit report. In some embodiments, if the apparatus is being used in confined spaces, the apparatus may include gas detection sensors in order to detect a gas leakage.

In some embodiments, the controller may determine the (locked or unlocked) position of the fastener based on an average of the proximity reading within a predetermined period of time. For example, if the helmet proximity distance was set to 20 and below to detect if it is was worn, and the controller reads as follows: At 0 second, 20; At 0.2 second, 21; At 0.4 second, 18; At 0.6 second, 24; At 0.8 second, 18; At 1 second, 17; At 1.2 second, 19; At 1.4 second, 21; At 1.6 second, 16; At 1.8 second, 22; At 2 second, 19, then the average is 19.5, and so the controller determines that the helmet is on and would not report as being "not worn." It should be noted, however, that 10 Hz is merely an example, and the controller in the apparatus can sample anywhere from 1 Hz to 5 GHz frequency.

Generally when electrical equipment is used in, around, or near an atmosphere that has flammable gases or vapors, flammable liquids, combustible dusts, ignitable fibers or flyings, there is always a possibility or risk that a fire or explosion might occur. Those areas where the possibility or risk of fire or explosion might occur due to an explosive atmosphere and/or mixture is often called a hazardous (or classified) location/area. Currently there are two systems used to classify these hazardous areas: the Class/Division system and the Zone system. The Class/Division system is used predominately in the United States and Canada, whereas the rest of the world generally uses the Zone system. However, the United States and Canada are trending more towards the Zone System. Hazardous locations per the Zone system are classified according to its Zone which can be gas or dust. For gas atmospheres, electrical equipment is further divided into Groups and Subgroups. A Zone defines the probability of the hazardous material, gas or dust, being present in sufficient quantities to produce explosive or ignitable mixtures. Zone 1, for example, has ignitable concentrations of flammable gases or vapors which are likely to occur under normal operating conditions.

In all of the embodiments disclosed above, the sensors, equipment, and devices are Zone 1 safe, i.e. they have a type of protection in which the enclosure can withstand the pressure developed during an internal explosion of an explosive mixture and that prevents the transmission of the explosion to the explosive atmosphere surrounding the enclosure and that operates at such an external temperature that a surrounding explosive gas or vapor will not be ignited there. Approved equipment is marked according to the protection concept for which it has been designed (Ex i, Ex d, Ex n, and etc.), the group (I, IIA, IIB, IIC, IIIA, IIIB, or IIIC), and temperature code (T1 through T6) that it is rated for. For the United States it will be preceded by which Class and Zone it is approved for. For example: Class I Zone 2 AEx nC IIC T5.

IoTs can change how we think about PPEs. Just as the introduction of seatbelts led to new regulations about driving safety, smart technology can raise the standards of health and safety. Therefore, the opportunity to save lives, cut down on injury-related costs, and drive product differentiation through innovation is available and active now, and the above example embodiments help achieve these objectives in a seamless manner.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur.

While there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A system for ensuring safety of a user, the system comprising:
    a first fastener configured to secure two or more ends of a harness around the user;
    a first sensor unit attached to the first fastener, the first sensor unit configured to generate a first signal when the first fastener is in a locked position;
    a tether attached to a portion of the harness, the tether configured to tether the user to a stationary or movable object;
    a second fastener attached to one end of the tether, the second fastener configured to secure the one end of the tether to the stationary or movable object;
    a second sensor unit attached to the second fastener, the second sensor unit configured to generate a second signal when the second fastener is in a locked position; and
    a controller unit wirelessly connected to the first sensor unit and the second sensor unit, the controller unit configured to receive the first signal or the second signal, and generate a third signal when the other of the first or the second signal is not received by the controller unit within a predetermined period of time from the receipt of the first signal or second signal, wherein the third signal is an app alert on a wearable device worn by the user.

2. The system according to claim 1, wherein the controller unit is further configured to identify the first fastener and the second fastener using a unique identifier associated with the first fastener and the second fastener.

3. The system according to claim 1, wherein the first sensor unit and the second sensor unit each comprise a contact sensor configured to generate a signal when the corresponding fastener is in a locked position.

4. The system according to claim 3, wherein the contact sensor comprises at least one of a piezoelectric sensor, capacitive sensor, resistive sensor, magnetostrictive sensor, and an optical sensor.

5. The system according to claim 3, wherein the first sensor unit and the second sensor unit each comprise a wireless transmitter configured to transmit the first signal or the second signal to the controller unit.

6. The system according to claim 5, wherein the first sensor unit and the second sensor unit each comprise a battery unit configured to provide power to the transmitter and the contact sensor.

7. The system according to claim 1, wherein the controller unit comprises at least one of a programmable logic controller, a general purpose controller, a processor, a smart phone, a smart watch, a smart ring, a smart band, and a wireless device.

8. The system according to claim 1, wherein the first sensor unit and the second sensor unit are wirelessly connected to the controller unit via radio frequency, Bluetooth, Bluetooth low energy, ZigBee, Wi-Fi, 2G, 3G, 4G LTE, 5G, or other wireless communication technique.

9. The system according to claim 1, wherein the first sensor unit and the second sensor unit each further comprise an altimeter configured to generate a signal when the corresponding fastener reaches a predetermined altitude.

10. The system according to claim 1, wherein the first sensor unit and the second sensor unit each further comprise an accelerometer configured to generate a signal when the corresponding fastener reaches a predetermined acceleration.

11. The system according to claim 1, wherein the controller unit further comprises a temperature sensor configured to measure a body temperature of the user, and generate a signal when the body temperature is above a predetermined threshold.

12. The system according to claim 1, wherein the controller unit further comprises a heart rate sensor configured to measure a heart rate of the user, and generate a signal when the heart rate is above a predetermined threshold.

13. The system according to claim 1, wherein the controller unit further comprises a chemical sensor configured to generate a signal when the amount of a chemical sensed or detected is above a predetermined threshold.

14. The system according to claim 1, wherein the tether comprises a belt, a rope, or a chain.

15. A method for ensuring safety of a user, the method comprising:
providing a first fastener configured to secure two or more ends of a harness around the user;
providing a first sensor unit in conjunction with the first fastener, the first sensor unit configured to generate a first signal when the first fastener is in a locked position;
attaching a tether to a portion of the harness, the tether configured to tether the user to a stationary or movable object;
attaching a second fastener to one end of the tether, the second fastener configured to secure the one end of the tether to the stationary or movable object;
providing a second sensor unit in conjunction with the second fastener, the second sensor unit configured to generate a second signal when the second fastener is in a locked position; and
wirelessly connecting a controller unit to the first sensor unit and the second sensor unit, wherein the controller unit is configured to receive the first signal or the second signal, and generate a third signal when the other of the first or the second signal is not received by the controller unit within a predetermined period of time from the receipt of the first signal or second signal, wherein the third signal is an app alert on a wearable device worn by the user.

16. The method according to claim 15, wherein the controller unit is further configured to identify the first fastener and the second fastener using a unique identifier associated with the first fastener and the second fastener.

17. The method according to claim 15, wherein the first sensor unit and the second sensor unit each comprise a contact sensor configured to generate a signal when the corresponding fastener is in a locked position.

18. The method according to claim 17, wherein the contact sensor comprises at least one of a piezoelectric sensor, capacitive sensor, resistive sensor, magnetostrictive sensor, and an optical sensor.

19. The method according to claim 17, wherein the first sensor unit and the second sensor unit each comprise a wireless transmitter configured to transmit the first signal or the second signal to the controller unit.

20. The method according to claim 19, wherein the first sensor unit and the second sensor unit each comprise a battery unit configured to provide power to the transmitter and the contact sensor.

21. The method according to claim 15, wherein the controller unit comprises at least one of a programmable logic controller, a general purpose controller, a processor, a smart phone, a smart watch, a smart ring, a smart band, and a wireless device.

22. The method according to claim 15, wherein the first sensor unit and the second sensor unit are wirelessly connected to the controller unit via radio frequency, Bluetooth, Bluetooth low energy, ZigBee, Wi-Fi, 2G, 3G, 4G LTE, 5G, or other wireless communication technique.

23. The method according to claim 15, wherein the first sensor unit and the second sensor unit each further comprise an altimeter configured to generate a signal when the corresponding fastener reaches a predetermined altitude.

24. The method according to claim 15, wherein the first sensor unit and the second sensor unit each further comprise an accelerometer configured to generate a signal when the corresponding fastener reaches a predetermined acceleration.

25. The method according to claim 15, wherein the controller unit further comprises a temperature sensor configured to measure a body temperature of the user, and generate a signal when the body temperature is above a predetermined threshold.

26. The method according to claim 15, wherein the controller unit further comprises a heart rate sensor configured to measure a heart rate of the user, and generate a signal when the heart rate is above a predetermined threshold.

27. The method according to claim 15, wherein the controller unit further comprises a chemical sensor configured to generate a signal when the amount of a chemical sensed or detected is above a predetermined threshold.

28. The method according to claim 15, wherein the tether comprises a belt, a rope, or a chain.

\* \* \* \* \*